United States Patent
Calagaz

(10) Patent No.: US 11,039,282 B2
(45) Date of Patent: Jun. 15, 2021

(54) SYSTEM AND METHOD FOR SELECTING ALTERNATE GLOBAL POSITIONING SYSTEM COORDINATES

(71) Applicant: Fishing Chaos, Inc, Mobile, AL (US)

(72) Inventor: John Calagaz, Mobile, AL (US)

(73) Assignee: Fishing Chaos, Inc, Mobile, AL (US)

( * ) Notice: Subject to any disclaimer, the term of this patent is extended or adjusted under 35 U.S.C. 154(b) by 0 days.

(21) Appl. No.: 16/813,552

(22) Filed: Mar. 9, 2020

(65) Prior Publication Data

US 2020/0288276 A1    Sep. 10, 2020

Related U.S. Application Data

(60) Provisional application No. 62/815,746, filed on Mar. 8, 2019.

(51) Int. Cl.
| | | |
|---|---|---|
| *H04W 4/029* | (2018.01) | |
| *H04W 4/021* | (2018.01) | |
| *A01K 99/00* | (2006.01) | |
| *H04L 29/08* | (2006.01) | |
| *G06N 7/02* | (2006.01) | |

(52) U.S. Cl.
CPC ............ *H04W 4/029* (2018.02); *A01K 99/00* (2013.01); *G06N 7/02* (2013.01); *H04L 67/306* (2013.01); *H04W 4/022* (2013.01); *H04W 4/021* (2013.01)

(58) Field of Classification Search
CPC ...... H04W 4/029; H04W 4/022; H04W 4/021
See application file for complete search history.

(56) References Cited

U.S. PATENT DOCUMENTS

| | | | | |
|---|---|---|---|---|
| 8,762,555 B1* | 6/2014 | Peterson | ................. | G06F 16/29 709/229 |
| 2010/0002012 A1* | 1/2010 | Andreasson | ............ | G01S 19/14 345/619 |
| 2011/0205229 A1* | 8/2011 | Jagadev | .................. | G06F 16/29 345/428 |
| 2011/0227699 A1* | 9/2011 | Seth | ..................... | G06F 16/9537 340/8.1 |
| 2012/0226889 A1* | 9/2012 | Merriman | ........... | G06F 16/2264 711/216 |
| 2015/0127638 A1* | 5/2015 | Parks | .................. | G06F 16/9537 707/723 |
| 2018/0032997 A1* | 2/2018 | Gordon | .............. | G06Q 30/0269 |
| 2019/0178657 A1* | 6/2019 | Benbrahim | ........ | G01C 21/3476 |

\* cited by examiner

*Primary Examiner* — Barry W Taylor
(74) *Attorney, Agent, or Firm* — AdamsIP, LLC; Edward Brinkley Garner, III; James Hunter Adams

(57) ABSTRACT

A system and method for selecting alternate global positioning system coordinates is provided. The system generally comprises a geolocation device, processor operably connected to the geolocation device, and non-transitory computer-readable medium having instructions stored thereon. The instructions instruct the system to select alternate GPS coordinates based off geospatial data received by the processor as well as parameters of the system that may limit the alternate GPS coordinates in which the system may select. The parameters may be selected within a user interface of the system.

4 Claims, 6 Drawing Sheets

SYSTEM AND METHOD FOR SELECTING ALTERNATE GLOBAL POSITIONING SYSTEM COORDINATES

FIELD OF THE DISCLOSURE

The subject matter of the present disclosure refers generally to a system for selecting alternate global positioning system coordinates.

BACKGROUND

Fishermen often have specific locations in which they like to fish. These fishing locations are often found by fishermen after extensive time, effort, and other resources have been spent. This leads to many fisherman being very protective of fishing locations they have discovered. Fishing guides are particularly protective of fishing locations they have discovered because they have a monetary interest in keeping the various fishing locations secret. If the fishing locations are not kept secret, they may become pressured and overfished, which may cause degradation of the fishing location to the point of it no longer being productive. For a fishing guide, a fishing location being degraded means a loss of resources due to resources they otherwise would have being diverted to discovering new fishing locations. Therefore, it is very important that fisherman both keep track of the various fishing locations they have discovered as well as keep these fishing locations secret from others so that these fishing locations do not become pressured. Traditionally, fishermen have used landmarks to help them remember the locations of particular fishing locations, but these landmarks can change over time. More recently fishermen have been able to use global positioning systems (GPS) to record geospatial coordinates that can be used to mark fishing location on a map of a global information system (GIS). The ability to use geospatial coordinates to track particular fishing spots has been very useful to fishermen, but one can't simply share exact geospatial coordinates with others without giving away the exact location of the fishing location.

Fisherman will sometimes share fishing locations with others, but it is more common for fisherman to disclose a general area in which a particular fishing location may be found. This allows a fisherman to help fellow fisherman by revealing general information regarding areas where fishing success may be had without giving the exact position of a favorite fishing location and risk that particular fishing location being pressured. Additionally, fishermen may attempt to describe landmarks of a fishing location to fellow fisherman, but this is often difficult to do and can easily lead to confusion. On the other hand, GPS coordinates provide an exact location of a fishing location; however, this is far more information than most fishermen are willing to give due to the threat of pressuring the fishing location. Further, it can be difficult to come up with alternate GPS coordinates to give other fisherman based on the GPS coordinates of a particular fishing location. Simply adding or subtracting from the latitude and longitude may or may not result in GPS coordinates that are over water or even accessible to other fishermen.

Accordingly, there is a need in the art for a system and method for creating alternate GPS coordinates over a specified terrain so that fishermen may share fishing locations with other fishermen without giving away the exact location of the fishing location in which they are sharing.

DESCRIPTION

A system and method for creating alternate global positioning system (GPS) coordinates is provided. In one aspect, the tool is a system and method for obscuring geospatial coordinates such that it may be shared with others in situations where exactness is not desirable. In another aspect, the tool is a system and method for generating new GPS coordinates over a specified terrain using the original GPS coordinates as a starting point. Generally, the system and method of the present disclosure are designed to obscure fishing locations of a fishermen in a way such that a fisherman can see the exact coordinates of a fishing location themselves but may share alternate GPS coordinates with other fisherman based off the original GPS coordinates.

The system generally comprises a geolocation device, processor operably connected to the geolocation device, and non-transitory computer-readable medium having instructions stored thereon, wherein the instructions instruct the processor to perform a specific task or group of tasks. In some embodiments, the system may further comprise a database that may store geolocation information thereon. The geolocation device may be operably connected to the processor in a way such that geospatial data may be transmitted from the geolocation device to the processor. In some instances, the processor may be operably connected to the database via one or more servers interconnected between the processor and the database. The geolocation device may measure and transmit geospatial data relevant for determining a user's geolocation and may be a single component of a larger computing device. A computer program may be tangibly embodied in a storage device of the mobile computing device. which may contain instructions that, when executed by the processor, cause the processor to perform an action. In the system of the present embodiment, the instructions may cause the system to select alternate GPS coordinates based off the geospatial data received by the processor and fuzzy parameters.

DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
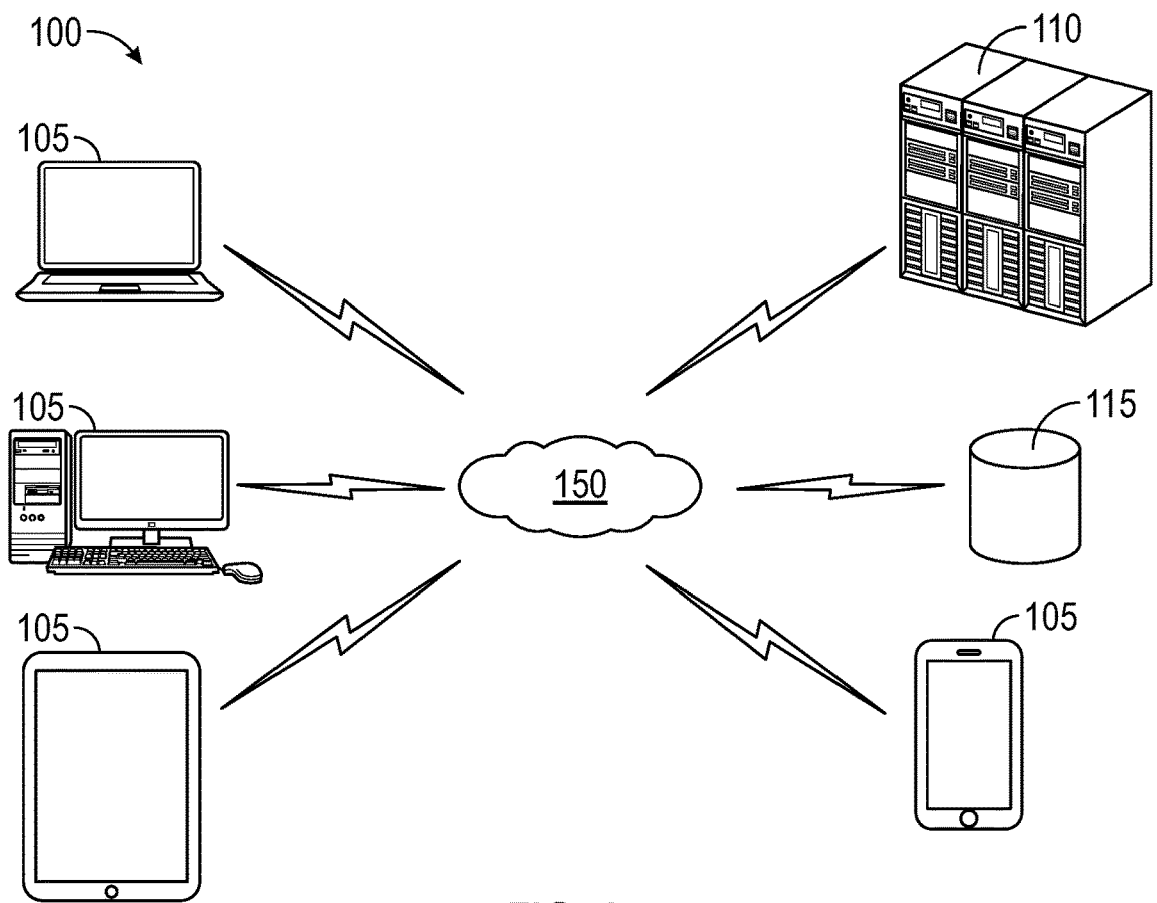
FIG. 1 is a diagram of an example environment in which techniques described herein may be implemented.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. As used herein, the term "database" refers to a set of related data and the way it is organized. Access to this data is usually provided by a database management system (DBMS) consisting of an integrated set of computer software that allows users to interact with one or more databases and provides access to all of the data contained in the database. The DBMS provides various functions that allow entry, storage and retrieval of large quantities of information and provides ways to manage how that information is organized. Because of the close relationship between the database and the DBMS, as used herein, the term "database" refers to both a database and DBMS. The term "current geolocation" and grammatical equivalents thereof are used herein to mean the actual location of an entity as illustrated in a geographic information system at the time of measurement. The term "fuzzy geolocation" and grammatical equivalents thereof are used herein to mean a manipulated geolocation as illustrated in a geographic information system. The term "fuzzy parameter" and grammatical equivalents thereof are used herein to mean a restriction to geolocations in which the system may select a fuzzy geolocation. The term "zone of reference" and grammatical equivalents thereof are used herein to mean a region on a plot of a geographic information system that contains eligible fuzzy geolocations from which the system may choose. The term "zone categories" and grammatical equivalents thereof are used herein to mean a specific zone of a global information system (GIS). For instance, zones of a raster dataset of a GIS may include, but are not limited to, a particular geographic feature or a zip code.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a personal digital assistant (PDA), a laptop, a smart phone, a tablet computer, or another type of computation or communication device. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document.

Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpage. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
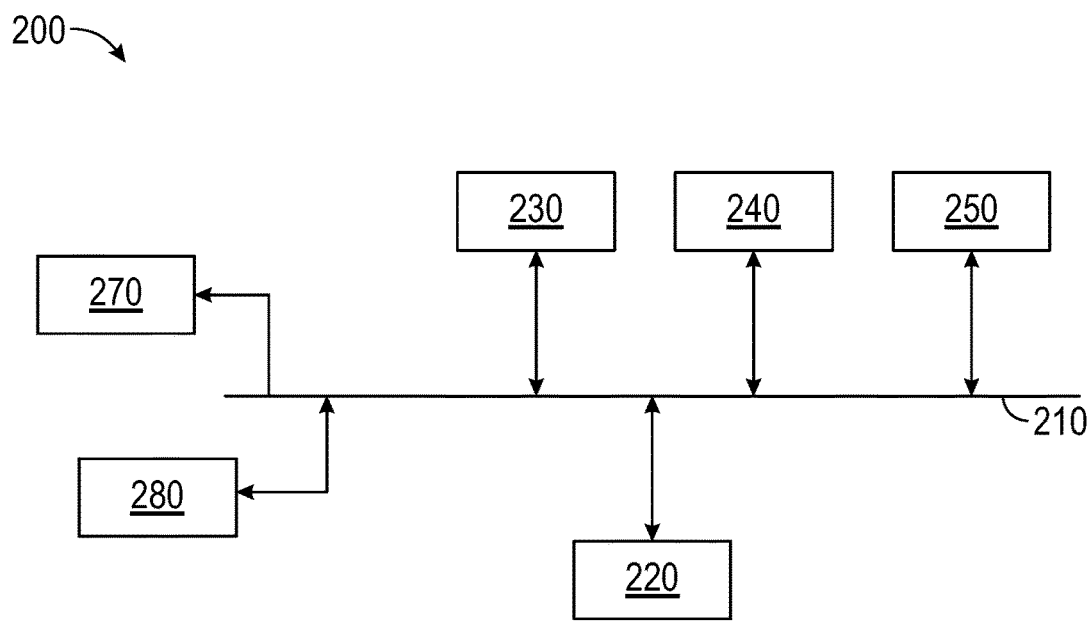
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280. The bus 210 may be defined as one or more conductors that permit communication among the components of the computing entity 200. The processor 220 may be defined as a logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication device of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers, mainframes, cellular telephones, tablet computers, or any other similar device.

Memory 304 stores information within computing device 300. In some preferred embodiments, memory 304 may include one or more volatile memory units. In another preferred embodiment, memory 304 may include one or more non-volatile memory units. Memory 304 may also include another form of computer-readable medium, such as a magnetic or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a fitness tracker may transfer data to a smartphone, wherein the smartphone may use that data in a manner separate from the fitness tracker.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
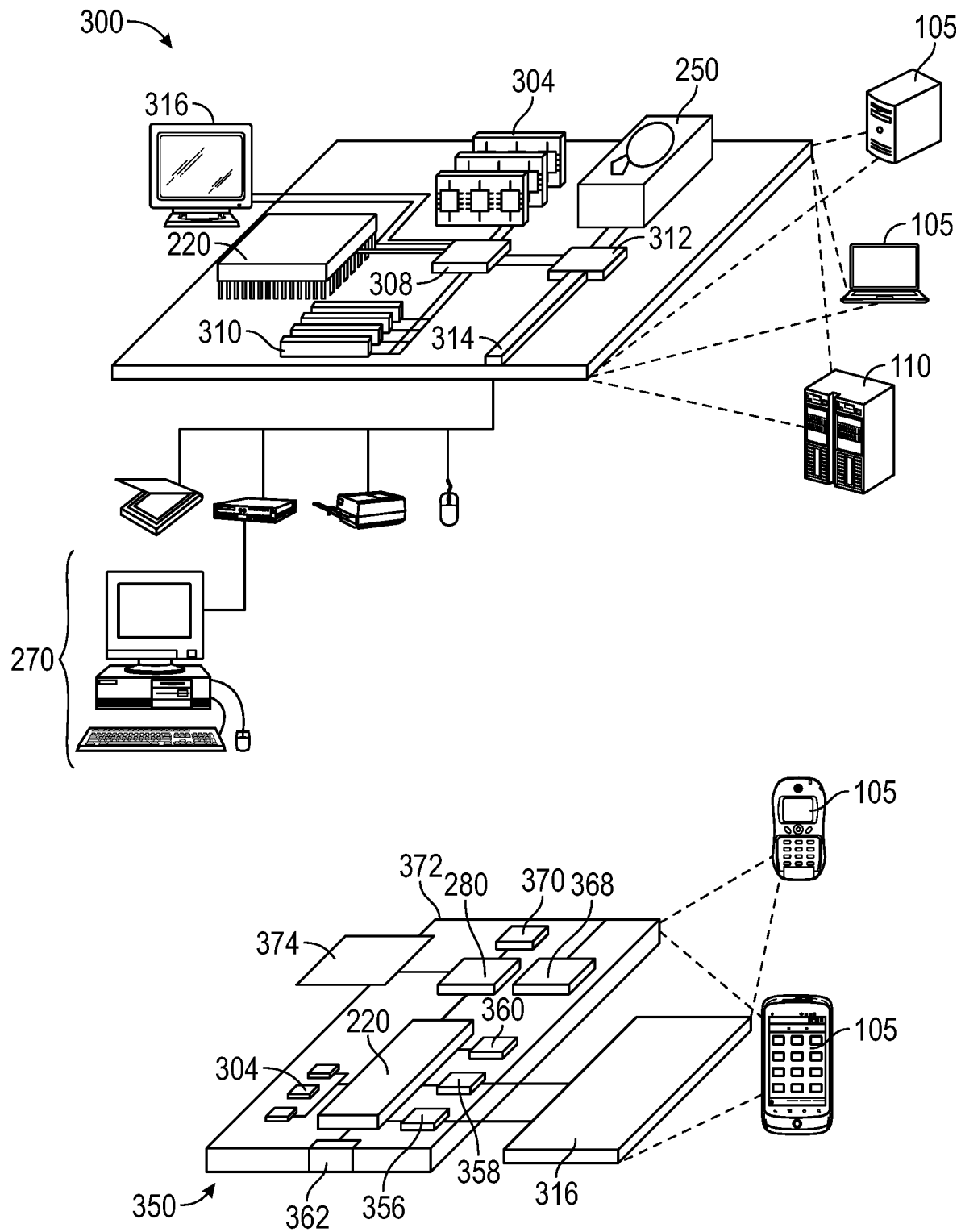
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers, databases, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System, Multimedia Messaging Service (MIMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with power. For instance, the power supply may be a stationary power outlet that supplies power via a cable extending from the stationary power outlet to the system 400. For instance, the power supply may be a battery that stores power within a feeds it directly to the system 400. The system 400 may also comprise of multiple power supplies that may provide power to the system 400 in different circumstances. For instance, the system 400 may be directly plugged into a stationary power outlet, which may provide power to the system 400 so long as it remains in one place. However, the system 400 may also be connected to a backup battery so that the system 400 may receive power even when it is not connected to a stationary power outlet or if the stationary power outlet ceases to provide power to the computing entity.

Figure 4:
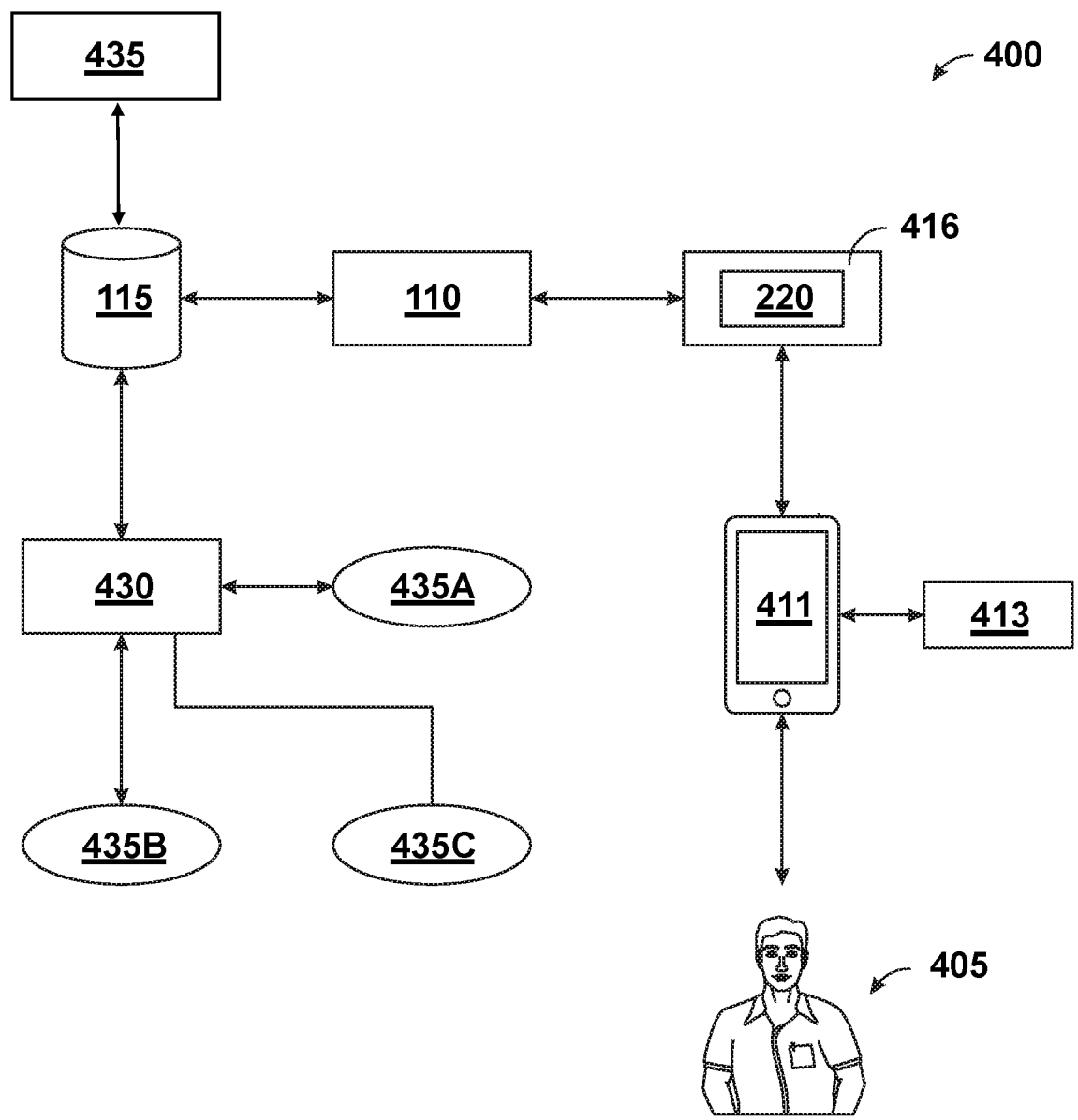
FIG. 4 is a diagram illustrating a system embodying features consistent with the principles of the present disclosure.
Figure 5:
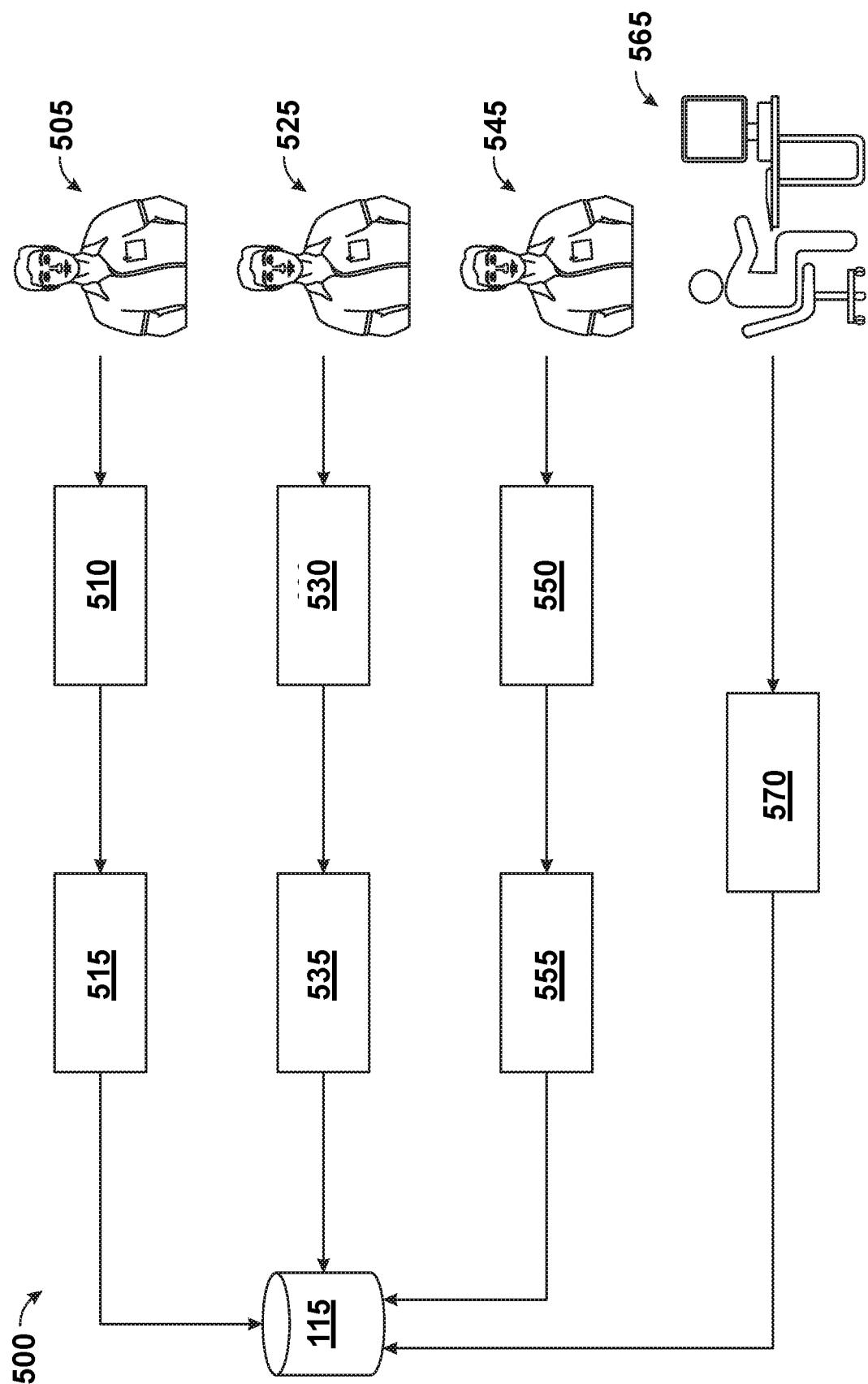
FIG. 5 is a diagram illustrating the manner in which individual access to data may be granted or limited based on user or administrator roles.
Figure 6:
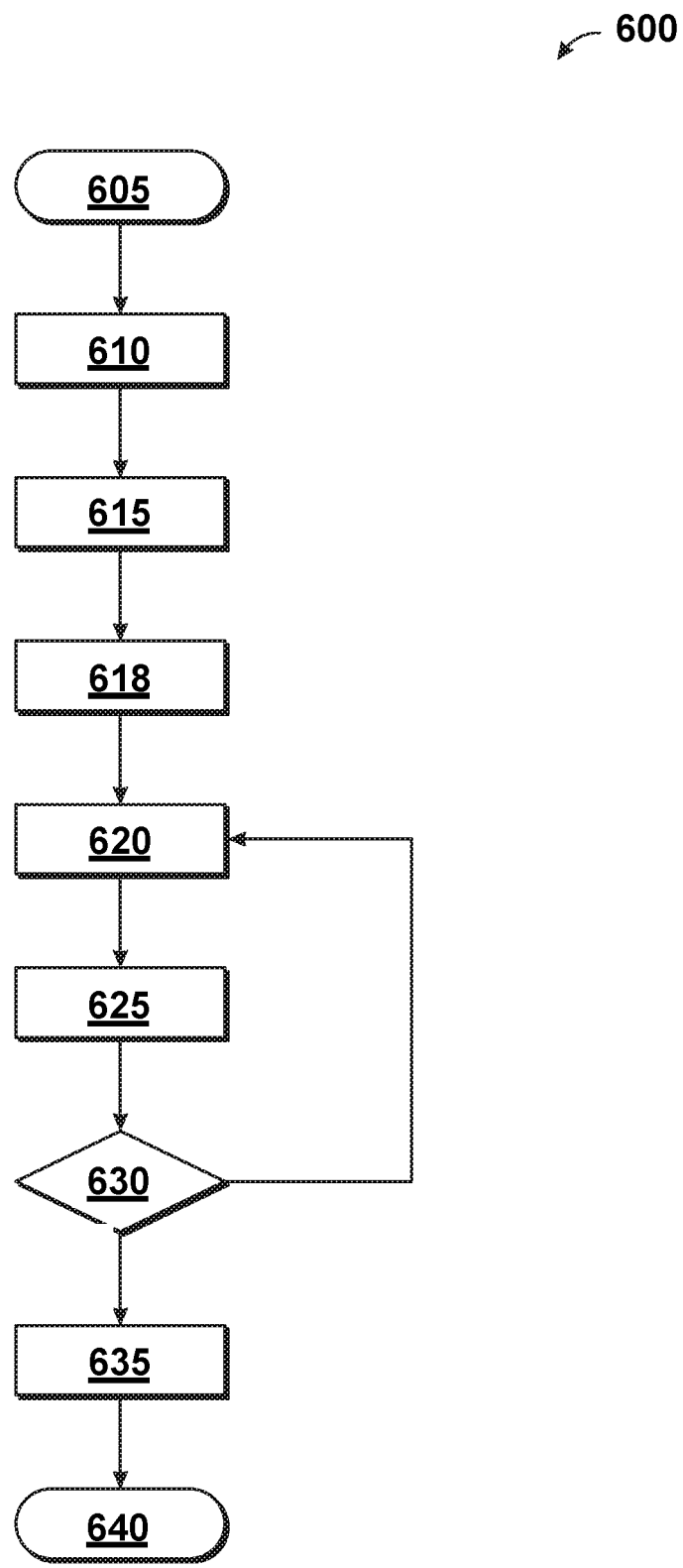
FIG. 6 is a flow chart illustrating certain method steps of a method embodying features consistent with the principles of the present disclosure.
Figure 7:
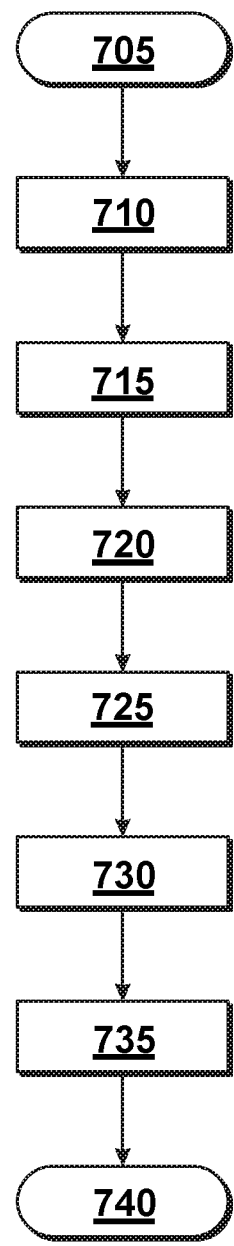
FIG. 7 is a flow chart illustrating certain method steps of a method embodying features consistent with the principles of the present disclosure.

FIGS. 4-7 illustrate embodiments of a system 400 and its various methods for selecting alternate GPS coordinates. As illustrated in FIG. 4, the system 400 generally comprises a geolocation device 413, processor 220 operably connected to the geolocation device 413, database 115 operably connected to the processor 220, and non-transitory computer-readable medium 416 having instructions stored thereon, wherein the instructions instruct the processor 220 to perform a specific task or group of tasks that allow the system 400 to manipulate GPS coordinates. The geolocation device 413 may be operably connected to the processor 220 in a way such that geospatial data may be transmitted from the geolocation device 413 to the processor 220. In some instances, the processor 220 may be operably connected to the database 115 via one or more servers interconnected between the processor 220 and the database 115. It is understood that the various method steps associated with the methods of the present disclosure may be carried out as operations by the system 400 shown in FIG. 4. FIG. 5 illustrates permission levels 500 that may be utilized by the present system 400 for controlling access to user content 515, 535, 555 such as current geolocations 435A and fuzzy geolocations 435B. FIGS. 6 and 7 illustrate various methods that may be carried out by the system 400.

The geolocation device 413 may be a single component of a larger computing device 300, such as the Global Positioning System (GPS) receiver module 370 of FIG. 3. In a preferred embodiment, the geolocation device 413 is part of a mobile computing device 350. In one preferred embodiment, the geolocation device 413 may comprise a plurality of devices working together to obtain a geolocation via triangulation. In a preferred embodiment, the geolocation device 413 is a GPS sensor. The GPS sensor may measure and transmit geospatial data relevant for determining geolocation. A GPS sensor may be defined as a receiver having an antenna designed to communicate with a navigation satellite system 400. Geospatial data may be spatial data including, but not limited to, numeric data, vector data, and raster data, or any combination thereof. Numeric data may be statistical data which includes a geographical component or field that can be joined with vector files so the data may be queried and displayed as a layer on a map in a GIS. Vector data may be data that has a spatial component, or X, Y coordinates assigned to it. Vector data may contain sets of points, lines, or polygons that are referenced in a geographic space. Raster data may be data in a .JPG, .TIF, .GIF or other picture file format. For instance, a map scanned in a flatbed scanner may be considered raster data. A raster dataset may comprise a number of cells, wherein every cell within the plurality of cells of the raster dataset belongs to at least one zone. Each group of connected cells in a zone is considered a region. A zone that consists of a single group of connected cells may have only one region, and the number of cells that make up a region has no practical limit. Zones may be composed of as many regions as necessary to represent a map feature.

As mentioned previously, the system 400 may further comprise a user interface 411. Geospatial data may be presented to the user 405 via a GIS of the user interface 411. For instance, a user 405 may share a fuzzy geolocation 435B with another user 405 via the user interface 411, wherein the fuzzy geolocation 435B may be viewed within a GIS of the user interface 411. A user interface 411 may be defined as a space where interactions between a user 405 and the system 400 may take place. In an embodiment, the interactions may take place in a way such that a user 405 may control the operations of the system 400. A user interface 411 may include, but is not limited to operating systems 400, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the system 400 to the user 405 via a display 316 operably connected to the processor 220. A display 316 may be defined as an output device that communicates data that may include, but is not limited to, visual, auditory, cutaneous, kinesthetic, olfactory, and gustatory, or any combination thereof.

Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored on a flash drive. For instance, a display 316 may present a soft copy of tactile information via a haptic suit, wherein the hard copy of the tactile information is stored within a database 115. Displays 316 may include, but are not limited to, cathode ray tube monitors, LCD monitors, light emitting diode (LED) monitors, gas plasma monitors, screen readers, speech synthesizers, virtual reality headsets, haptic suits, speakers, and scent generating devices, or any combination thereof.

The instructions may be stored on a non-transitory computer-readable medium 416 that may be coupled to the processor 220, as shown in FIG. 4. Alternatively, the instructions may be stored or included within the processor 220. Examples of non-transitory computer-readable mediums 416 may include, but are not limited to, magnetic media such as hard disks, floppy disks, and magnetic tape; optical media such as CD ROM discs and DVDs; magneto-optical media such as optical discs; and hardware devices that are specially configured to store and perform instructions, such as read-only memory (ROM), random access memory (RAM), or flash memory. The described hardware devices may be configured to act as one or more software modules in order to perform the operations disclosed herein. In another embodiment, user profiles 430 may be stored within the non-transitory computer-readable medium 416 of the system 400 in a way such that geospatial data may be viewed using the user interface 411.

Alternatively, the system 400 may store the geospatial data within user profiles 430 of a database 115 operably connected to the processor 220. The database 115 may be a relational database such that the geospatial data may be stored, at least in part, in one or more tables. Alternatively, the database 115 may be an object database such that the geospatial data may be stored, at least in part, as objects. In some instances, the database 115 may comprise a relational and/or object database and a server 110 dedicated solely to managing the geospatial data in the manner disclosed herein. In an embodiment, the server 110 may be operably connected to the processor 220 and the database 115 in a way such that the server 110 may receive the geospatial data from the processor 220 and subsequently transfer the geospatial data to the database 115.

The system 400 may use fuzzy parameters 435C to limit the number geolocations in which the system 400 may select a fuzzy geolocation 435B. Fuzzy parameters 435C may be stored within a user profile 430 as user content 515, 535, 555 or may be settings within a user interface 411 of the system 400. Types of fuzzy parameters that may be used by the system 400 include, but are not limited to, terrain data, elevation data, zone categories, and distance data, or any combination thereof. In one preferred embodiment, the database 115 may contain terrain data that the system 400 may use to determine whether a geolocation is located on a specific type of terrain, such as water or land, or area, such as Mobile Bay or the Mohave Desert. For instance, a fuzzy parameter 435C restricting the system 400 to selecting fuzzy geolocations 435B in areas of a map of a GIS that represent terrain having water may be instituted to prevent the system 400 from selecting fuzzy geolocations 435B in areas of a map of a GIS that represent terrain having dry land. For instance, a fuzzy parameter 435C restricting the system 400 to choosing fuzzy geolocations 435B in areas of a map of a GIS that are equal in elevation to the current geolocation 435A may be instituted to prevent the system 400 from choosing fuzzy geolocations 435B that deviate from the current elevation. For instance, a fuzzy parameter 435C restricting the restricting the system 400 to selecting fuzzy geolocations 435B within 10 miles of the current geolocation 435A may be instituted to limit the range in which the system 400 may select a fuzzy geolocation 435B. For instance, a fuzzy parameter 435C restricting the system 400 to selecting fuzzy geolocations 435B in areas of a map of a GIS that represent a zone category of Chesapeake Bay may be instituted to limit the system 400 to selecting fuzzy geolocations 435B located within that zone category.

To prevent an un-authorized user 405 from accessing other user's 405 information, the system 400 may employ a security method. As illustrated in FIG. 5, the security method of the system 400 may comprise a plurality of permission levels 500 that may grant users 405 access to user content 515, 535, 555 within the database 115 while simultaneously denying users 405 without appropriate permission levels 500 the ability to view user content 515, 535, 555. To access the user content 515, 535, 555 stored within the database 115, users 405 may be required to make a request via a user interface 411. Access to the data within the database 115 may be granted or denied by the processor 220 based on verification of a requesting user's 505, 525, 545 permission level 500. If the requesting user's 505, 525, 545 permission level 500 is sufficient, the processor 220 may provide the requesting user 505, 525, 545 access to user content 515, 535, 555 stored within the database 115. Conversely, if the requesting user's 505, 525, 545 permission level 500 is insufficient, the processor 220 may deny the requesting user 505, 525, 545 access to user content 515, 535, 555 stored within the database 115. In an embodiment, permission levels 500 may be based on user roles 510, 530, 550 and administrator roles 570, as illustrated in FIG. 5. User roles 510, 530, 550 allow requesting users 505, 525, 545 to access user content 515, 535, 555 that a user 405 has uploaded and/or otherwise obtained through use of the system 400. Administrator roles 570 allow administrators 565 to access system 400 wide data.

In an embodiment, user roles 510, 530, 550 may be assigned to a user 405 in a way such that a requesting user 505, 525, 545 may view user profiles 430 containing current geolocations 435A and fuzzy geolocations 435B via a user interface 411. To access the data within the database 115, a user 405 may make a user request via the user interface 411 to the processor 220. In an embodiment, the processor 220 may grant or deny the request based on the permission level 500 associated with the requesting user 505, 525, 545. Only users 405 having appropriate user roles 510, 530, 550 or administrator roles 570 may access the data within the user profiles 430. For instance, as illustrated in FIG. 5, requesting user 1 505 has permission to view user 1 content 515 and user 2 content 535 whereas requesting user 2 525 only has permission to view user 2 content 535. Alternatively, user content 515, 535, 555 may be restricted in a way such that a user 405 may only view a limited amount of user content 515, 535, 555. For instance, requesting user 3 545 may be granted a permission level 500 that only allows them to view user 3 content 555 related to their specific geolocations but not user 3 content related to fuzzy geolocations 435B. In the example illustrated in FIG. 5, an administrator 565 may bestow a new permission level 500 on users 405 so that it may grant them greater permissions or lesser permissions. For instance, an administrator 565 may bestow a greater permission level 500 on other users 405 so that they may view user 3's content 555 and/or any other user's 405 content. Therefore, the permission levels 500 of the system 400 may be assigned to users 405 in various ways without departing from the inventive subject matter described herein.

FIG. 6 provides a flow chart 600 illustrating certain, preferred method steps that may be used to carry out the method of creating a fuzzy geolocation 435B. Step 605 indicates the beginning of the method. During step 610 the processor 220 may receive geospatial data from the system 400. In a preferred embodiment, the system 400 may receive geospatial data from a geolocation device 413. Once the processor 220 has received the geospatial data from the system 400, the processor 220 may save the geospatial data in a user profile 430 during step 615. In one preferred embodiment, the system 400 may proceed without saving the geospatial data within a user profile 430. The processor 220 may transform the geospatial data into a geolocation that may be used within a GIS of the user interface 411 during step 618. The processor 220 may then select a fuzzy geolocation 435B on a map within the GIS during step 620. In one preferred embodiment, the fuzzy geolocation 435B is selected within a specific area of the map within the GIS. For instance, a fuzzy parameter 435C may be selected within the user interface 411 that instructs the system 400 to select a fuzzy geolocation 435B within a one-mile radius of the current geolocation 435A. For instance, a fuzzy parameter 435C may be selected within the user interface 411 that instructs the system 400 to select a fuzzy geolocation 435B having a zip code (zone category) consistent with the current geolocation 435A.

The processor 220 may perform a query to determine if the fuzzy geolocation 435B meets any selected fuzzy parameters 435C during step 625. The processor 220 may perform an action based on the results of the query during step 630. If the processor determines that the fuzzy geolocation 435B does not fit the restriction of the fuzzy parameters 435C, the system 400 may return to step 620. For instance, if a fuzzy parameters 435C pertaining to terrain data is set to "roadways" and the selected fuzzy geolocation 435B does not coincide with a "roadway" within the GIS, the system 400 may select a new fuzzy geolocation 435B until a fuzzy geolocation 435B is chosen that fits the terrain type. If the processor 220 determines that the fuzzy geolocation 435B does fit the restriction of the fuzzy parameters 435C, the processor 220 may save the fuzzy geolocation 435B within the user profile 430 during step 635. For instance, if a fuzzy parameters 435C pertaining to terrain data is set to "none," the selected fuzzy geolocation 435B will coincide with the terrain data regardless of the terrain of the selected fuzzy geolocation 435B, allowing the method to proceed to step 635. In one preferred embodiment, the system 400 may create multiple fuzzy geolocations 435B and save them within the user profile 430. In another preferred embodiment, the system 400 may create a plurality of fuzzy geolocations 435B and choose one or more of the fuzzy geolocations 435B within the plurality of fuzzy geolocations 435B that fit the selected fuzzy parameters 435C. Once the processor 220 has saved the fuzzy geolocation 435B within a user profile 430, the method may proceed to the terminate method step 640.

In one preferred embodiment, the system 400 may proceed to the terminate method step 640 without saving the fuzzy geolocation 435 within a user profile 430. In another preferred embodiment, the processor 220 may transmit the fuzzy geolocation 435B to a third party prior to proceeding the terminate method step 640. In yet another preferred the system 400 may display the fuzzy geolocation 435B via the user interface 411 prior to proceeding to the terminate method step 640. The system 400 may also be configured in a way that allows a user 405 to choose a fuzzy geolocation 435B within a plurality of fuzzy geolocations 435B presented to the user 405 via the user interface 411 prior to proceeding to the terminate method step 640. For instance, once the system 400 has selected a number of fuzzy geolocations 435B, it may present them to the user 405 via the user interface 411 and the display 316. The user 405 may then select one of the fuzzy geolocations 435B presented to them, and the system 400 may then subsequently save the selected fuzzy geolocation 435B with a user profile 430 of the system 400.

FIG. 7 provides a flow chart 700 illustrating certain, preferred method steps that may be used to carry out the method of creating a fuzzy geolocation 435B by creating a zone of reference 435. Step 705 indicates the beginning of the method. During step 710 the processor 220 may receive geospatial data from the system 400. Once the processor 220 has received the geospatial data from the system 400, the processor 220 may save the geospatial data in a user profile 430 during step 715. In one preferred embodiment, the system 400 may proceed without saving the geospatial data within a user profile 430. The processor 220 may transform the geospatial data into a current geolocation 435A that may be used within a GIS of the user interface 411 during step 720. The processor 220 may then use the current geolocation 435A and at least one fuzzy parameter 435C of the system 400 to create a zone of reference 435 during step 725. For instance, a system 400 having fuzzy parameters 435C for distance data set to one mile and terrain data set to "water" may have a zone of reference 435 limited to instances where a map of a GIS represents "water" within one mile of the current geolocation 435A. For instance, a system 400 having fuzzy parameters 435C for distance data set to twenty-five miles and terrain data set to "interstate" may have a zone of reference 435 limited to instances where a map of a GIS represents "interstate" within twenty-five miles of the current geolocation 435A. In one preferred embodiment, the system 400 may create a table containing all of the geolocations within the zone of reference 435 from which the system 400 may select a fuzzy geolocation 435B in subsequent steps.

Once the zone of reference 435 has been created by the system 400, the system 400 may select a fuzzy geolocation 435B on a map within a GIS so long as it is within the zone of reference 435 created by the system 400. For instance, a system 400 having fuzzy parameters 435C for distance data set to five square miles centered on the current geolocation 435A and terrain data set to "river" may choose a fuzzy geolocation 435B that coincides with a geolocation within that zone of reference 435. The processor 220 may save the fuzzy geolocation 435B within the user profile 430 during step 735. In one preferred embodiment, the processor 220 may transfer the current geolocation 435A and fuzzy geolocation 435B to a database 115. In another preferred embodiment, the system 400 may present the current geolocation 435A and/or the fuzzy geolocation 435B within a map of a GIS via a display 316. Once the processor 220 has saved the fuzzy geolocation 435B within a user profile 430, the method may proceed to the terminate method step 740.

In one preferred embodiment, the system 400 may proceed to the terminate method step 740 without saving the fuzzy geolocation 435 within a user profile 430. In another preferred embodiment, the processor 220 may transmit the zone of reference 435 and/or fuzzy geolocation 435B to a third party prior to proceeding the terminate method step 640. In yet another preferred the system 400 may display the zone of reference 435 via the user interface 411 prior to proceeding to the terminate method step 640. The system 400 may also be configured in a way that allows a user 405 to choose a fuzzy geolocation 435B within a zone of reference 435 presented to the user 405 via the user interface 411 prior to proceeding to the terminate method step 640. For instance, once the system 400 has created a zone of reference 435, it may present the zone of reference 435 to the user 405 via the user interface 411 and the display 316. The user 405 may then select a fuzzy geolocations 435B within the zone of reference 435 represented within the GIS, and the system 400 may then subsequently save the selected fuzzy geolocation 435B with a user profile 430 of the system 400.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for selecting alternate global positioning system coordinates comprising,
    a processor operably connected to a computing entity,
        wherein said computing entity hosts a user interface having a GIS and used to display a fuzzy geolocation,
    a power supply,
    a display operably connected to said processor,
    a non-transitory computer-readable medium coupled to said processor and having instructions stored thereon, which, when executed by said processor, cause said processor to perform operations comprising:
    receiving geospatial data,
    transforming said geospatial data into a current geolocation
    selecting said fuzzy geolocation from a plurality of geolocations,
        wherein said plurality of geolocations are determined using said current geolocation and a fuzzy parameter,
    charting said fuzzy geolocation within said GIS of said user interface,
    determining whether terrain data related to said fuzzy geolocation within said GIS matches a physical environmental feature, and
    accepting said fuzzy geolocation upon a determination that said terrain data related to said fuzzy geolocation within said GIS matches said physical environmental feature.

2. The system of claim 1, wherein said fuzzy parameters include at least one of terrain data, elevation data, zone categories, and distance data.

3. The system of claim 1, wherein data received and sent from said processor is saved within at least one of said computer readable medium and a database.

4. The system of claim 3, wherein said data is saved within user profiles, wherein permission levels of said user profiles determine whether said user can view at least one of said current geolocation and said fuzzy geolocation.

* * * * *